United States Patent
Stevens

(10) Patent No.: US 10,737,558 B2
(45) Date of Patent: Aug. 11, 2020

(54) ADJUSTABLE VEHICLE VISOR

(71) Applicant: Mark Stevens, Albuquerque, NM (US)

(72) Inventor: Mark Stevens, Albuquerque, NM (US)

( * ) Notice: Subject to any disclaimer, the term of this patent is extended or adjusted under 35 U.S.C. 154(b) by 60 days.

(21) Appl. No.: 16/253,284

(22) Filed: Jan. 22, 2019

(65) Prior Publication Data
US 2019/0366810 A1 Dec. 5, 2019

Related U.S. Application Data

(60) Provisional application No. 62/680,202, filed on Jun. 4, 2018.

(51) Int. Cl.
*B60J 3/00* (2006.01)
*B60J 3/02* (2006.01)

(52) U.S. Cl.
CPC .......... *B60J 3/0256* (2013.01); *B60J 3/0234* (2013.01)

(58) Field of Classification Search
CPC .............................. B60J 3/0256; B60J 3/0234
See application file for complete search history.

(56) References Cited

U.S. PATENT DOCUMENTS

| 1,474,727 A * | 11/1923 | Naterman | B60J 3/02 296/95.1 |
| 1,482,078 A * | 1/1924 | Hiatt | B60J 3/002 296/95.1 |
| 5,947,544 A | 9/1999 | Hubeshi | |
| 6,811,201 B2 | 11/2004 | Naik | |
| 7,384,088 B2 | 6/2008 | Remy | |
| 8,308,217 B2 | 11/2012 | Patel et al. | |
| 8,616,610 B1 | 12/2013 | Martinez | |
| 2004/0217621 A1 * | 11/2004 | McCoy | B60J 3/0204 296/97.6 |
| 2014/0284958 A1 * | 9/2014 | Lin | B60J 3/0204 296/97.6 |

FOREIGN PATENT DOCUMENTS

| CH | 193199 A * | 9/1937 | ............ B60J 3/0226 |
| FR | 2944483 A1 * | 10/2010 | ............ B60J 3/0256 |

* cited by examiner

*Primary Examiner* — Lori L Lyjak
(74) *Attorney, Agent, or Firm* — Boudwin Intellectual Property; Daniel Boudwin

(57) ABSTRACT

An adjustable vehicle visor. The adjustable vehicle visor includes a track securable to a vehicle ceiling, wherein an actuator is slidably disposed within the track. A motor is connected to the actuator and can move the actuator along the track when the motor is actuated. An arm having a longitudinal aperture extending between opposing ends thereof is affixed to the actuator along the longitudinal aperture, such that the arm can rotate about the actuator when the motor is actuated. A visor is pivotally affixed to the arm, the visor having a telescopic panel therein that can selectively move between an extended position and a retracted position. A remote device is in wireless communication with the motor, wherein the remote device can transmit a control signal to actuate the motor.

15 Claims, 5 Drawing Sheets

US 10,737,558 B2

ADJUSTABLE VEHICLE VISOR

CROSS REFERENCE TO RELATED APPLICATIONS

This application claims the benefit of U.S. Provisional Application No. 62/680,202 filed on Jun. 4, 2018. The above identified patent application is herein incorporated by reference in its entirety to provide continuity of disclosure.

BACKGROUND OF THE INVENTION

The present invention relates to vehicle visors. More particularly, the present invention pertains to adjustable vehicle visor systems configured to be remotely adjusted by control inputs from a remote device.

Many people use vehicle visors to reduce glare and otherwise make viewing the road surface easier, however, traditional vehicle visors often require users to exert excessive force to maneuver the visor in a desired position. This can often lead to distracted driving, increasing the risk of accidents, injury, or the like. Additionally, traditional vehicle visors often have a limited range of motion, leading to glare or sunlight affecting the driver at certain angles that the visor cannot reach. At various times of day, the intensity of the sunlight or glare can significantly impact a driver's ability to drive safely, leading to a higher potential for vehicular accidents. Therefore, an adjustable vehicle visor that more effectively blocks sunlight with a wider range of motion than traditional vehicle visors is desired.

In light of the devices disclosed in the known art, it is submitted that the present invention substantially diverges in design elements from the known art and consequently it is clear that there is a need in the art for an improvement to existing vehicle visors. In this regard, the instant invention substantially fulfills these needs.

SUMMARY OF THE INVENTION

In view of the foregoing disadvantages inherent in the known types of vehicle visors now present in the known art, the present invention provides a vehicle visor wherein the same can be utilized for providing convenience for the user when adjusting one or more vehicle visors remotely.

The present system comprises a track removably securable to a ceiling of a vehicle, wherein an actuator is slidably disposed within the track. A motor is operably connected to the actuator, wherein the actuator is configured to move along the track when the motor is actuated. An arm having a longitudinal aperture extending between a proximal end thereof and a distal end thereof is operably affixed to the actuator along the longitudinal aperture, such that the arm is configured to rotate about the actuator when the motor is actuated. A visor is pivotally affixed to the distal end of the arm, wherein the visor comprises a panel telescopically disposed therein, the panel configured to selectively move between an extended position and a retracted position. An outer edge of the panel is aligned with an end of the visor when the panel is in the retracted position. A remote device is in wireless communication with the motor, wherein the remote device is configured to transmit a control signal to actuate the motor.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
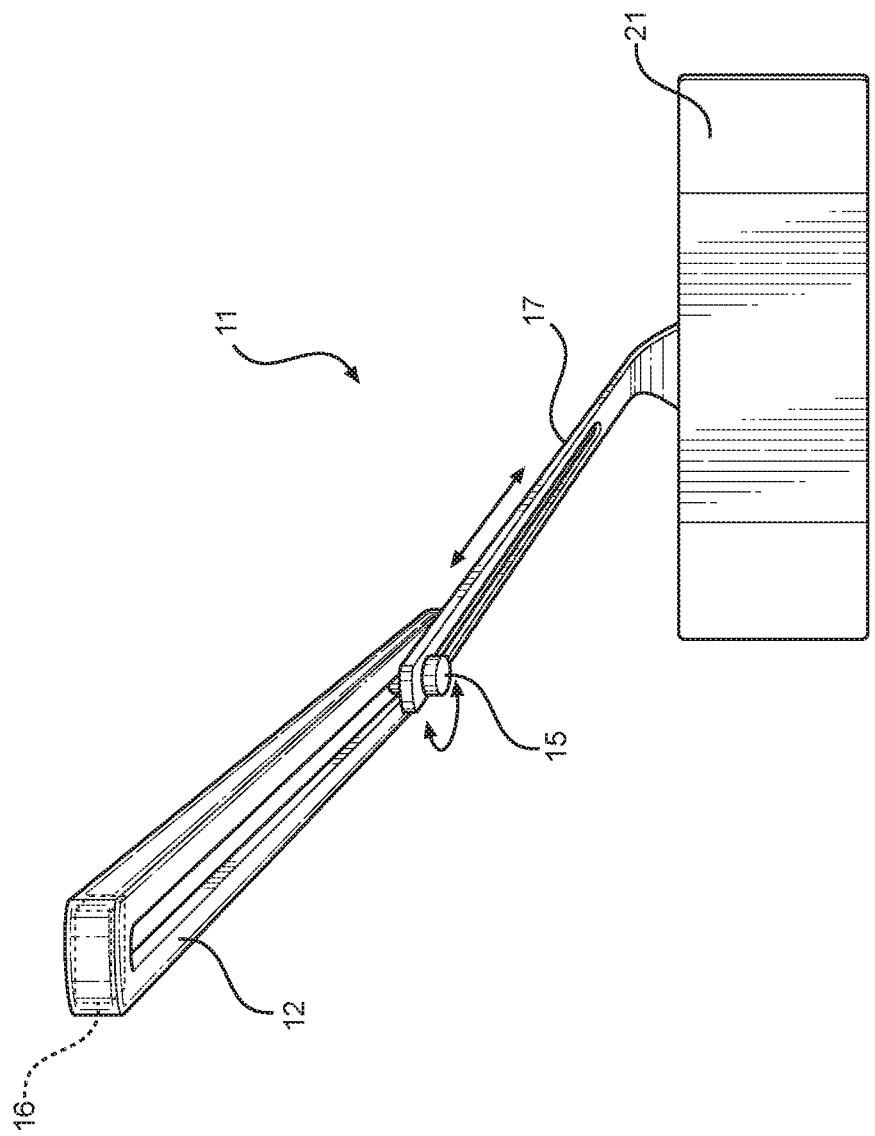
FIG. 1 shows a perspective view of an embodiment of the adjustable vehicle visor.

Reference is made herein to the attached drawings. Like reference numerals are used throughout the drawings to depict like or similar elements of the adjustable vehicle visor. The figures are intended for representative purposes only and should not be considered to be limiting in any respect.

Referring now to FIG. 1, there is shown a perspective view of an embodiment of the adjustable vehicle visor. The adjustable visor system 11 comprises a track 12 removably securable to a vehicle ceiling, wherein the track 12 can be positioned as desired therein, however, in the exemplary embodiment, the track 12 is positioned substantially parallel to the side windows of the vehicle. In some embodiments multiple adjustable visor systems 11 are contemplated to be installed in the same vehicle, such that each occupant can control an associated adjustable visor system 11. The adjustable visor system 11 further comprises an actuator 15 disposed within the track 12, wherein the actuator 15 is configured to slide along the track 12 when a motor 16 operably connected to the actuator 15 is actuated. An arm 17 is disposed on the actuator 15, wherein the arm 17 further comprises a visor 21 disposed on a distal end thereof.

The adjustable visor system 11 is movable along various independent axes, such that the arm 17 and the visor 21 can be positioned as desired within the vehicle. In the illustrated embodiment, the arm 17 is configured to move along a longitudinal axis thereof, as well as pivot about the actuator 15 when a command input is received by the motor 16. As the actuator 15 is slidable along the track 12, the entire visor 21 can be moved about the interior of the vehicle as desired. In this way, the adjustable visor system 11 is movable in any direction along a plane parallel to the arm 17 and the track 12.

Figure 2:
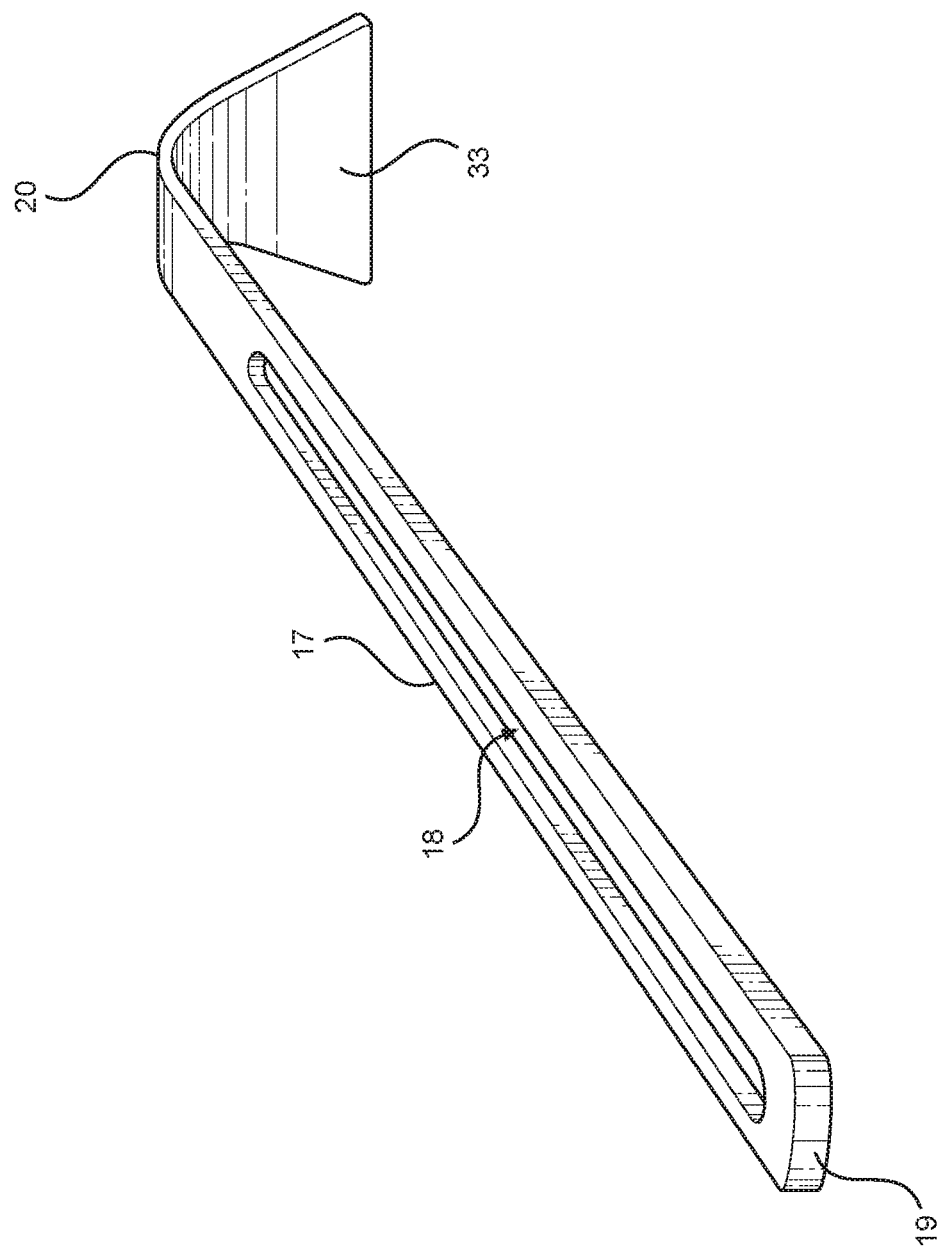
FIG. 2 shows a perspective view of the arm of an embodiment of the adjustable vehicle visor.

Referring now to FIG. 2, there is shown a perspective view of the arm of an embodiment of the adjustable vehicle visor. The arm 17 comprises a longitudinal aperture 18 extending between a proximal end 19 thereof and a distal end 20 thereof. In the illustrated embodiment, a linear distance between the proximal end 19 and the longitudinal aperture 18 is less than a linear distance between the distal end 20 and the longitudinal aperture 18. In this way, the arm 17 is prevented from moving in such a way as to cause the visor to impact the track. The arm 17 is configured to move along the longitudinal aperture 18 via the actuator, such that a linear distance between the distal end 20 and the track can be adjusted as desired. In this way, the longitudinal aperture 18 operates as a secondary track independent of the track.

A flange 33 is pivotally affixed to the distal end 20 of the arm 17, wherein the flange 33 is configured to removably secure the visor thereto, such as via frictional engagement. In the illustrated embodiment, the flange 33 increases in width from the distal end 20 of the arm towards an opposing end of the flange 33. In this way, a surface area of the flange 33 in contact with the visor is increased, providing a more secure frictional engagement therewith. In some embodiments, the flange 33 is pivotable about a singular axis, however, in alternate embodiments, the flange 33 is affixed to the distal end 20 via a ball-joint, thereby allowing an attached visor to rotate in a full 360-degree range of motion limited only by the position of the arm.

Figure 3:
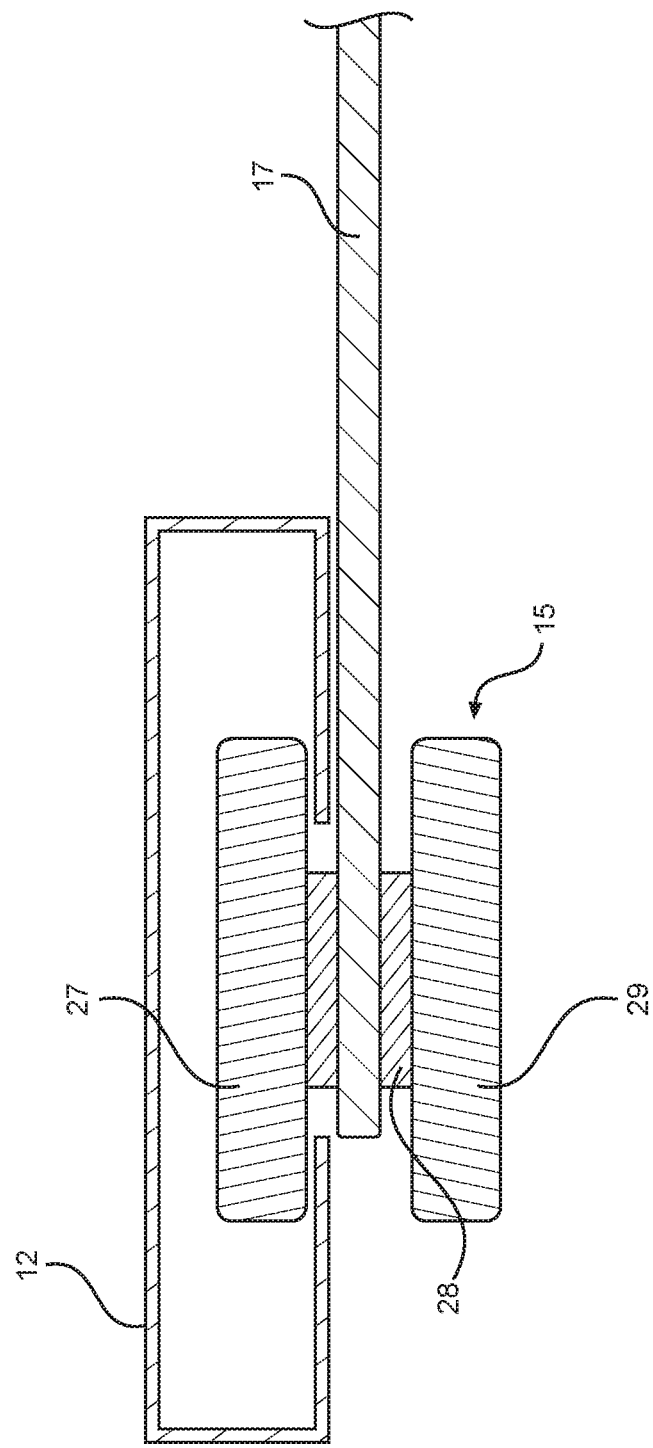
FIG. 3 shows a cross-sectional view of an embodiment of the adjustable vehicle visor.

Referring now to FIG. 3, there is shown a cross-sectional view of an embodiment of the adjustable vehicle visor. The actuator 15 is disposed within the track 12 and is configured to travel therealong when the motor is actuated by a command signal. In the illustrated embodiment, the actuator 15 comprises an upper section 27, a central section 28, and a lower section 29, wherein the upper and lower sections 27, 29 comprise a greater diameter than that of the central section. In this way, the arm 17 affixed about the central section 28 is secured therebetween, thereby preventing movement of the arm 17 about a longitudinal axis of the actuator 15. The upper section 27 is disposed entirely within the track 12, such that the upper section 27 comprises a diameter greater than an opening of the track 12, thereby securing the actuator 15 within the track 12.

The actuator 15 is configured to move the arm 17 along multiple axes. The actuator 15 is configured to move along the track 12, as well as rotate the arm 17 about the longitudinal axis of the actuator 15. Additionally, in some embodiments, the actuator 15 is further configured to move the arm 17 along the longitudinal aperture therein, such that the arm 17 is movable about a plane parallel to that of the arm 17 and the track 12. In some embodiments, each of the upper section 27, the central section 28, and the lower section 29 are configured to independently rotate about the longitudinal axis of the actuator 15, thereby allowing a user to simultaneously move the arm 17 along multiple independent axes. In an alternate embodiment, the actuator 15 further comprises a plurality of wheels thereon in operably communication with the motor, wherein the plurality of wheels are configured to independently activate when the motor is actuated. The plurality of wheels are further configured to move the actuator along the track 12, the arm 17 along the longitudinal aperture, and rotate the arm 17 about the central section 28.

Figure 4:
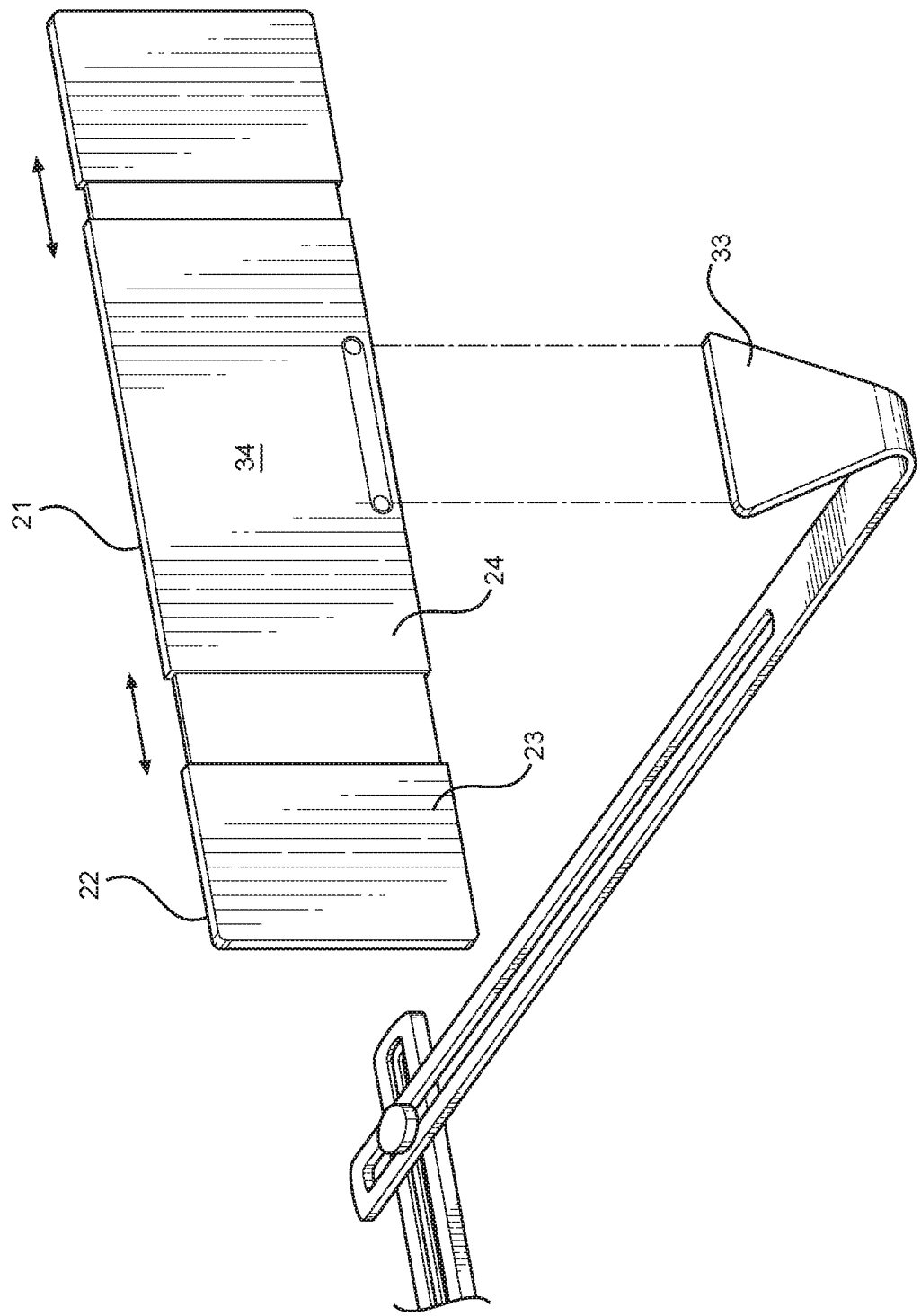
FIG. 4 shows an exploded view of the visor of an embodiment of the adjustable vehicle visor.

Referring now to FIG. 4, there is shown an exploded view of the visor of an embodiment of the adjustable vehicle visor. The visor 21 is removably securable to the flange 33 disposed on the arm, such that the visor 21 is pivotable about the arm. In the illustrated embodiment, the visor 21 further comprises a slot thereon, wherein the flange 33 is configured to be removably secured within the slot, such that the flange 33 is disposed within the visor 21 when the visor 21 is affixed thereto. In some embodiments, the visor 21 is configured to frictionally engage the flange 33, while in alternate embodiments, the visor 21 is secured to the flange 33 via a fastener. In some embodiments, an exterior surface 34 of the visor 21 comprises an ultraviolet light impermeable material, such that ultraviolet light cannot pass through the visor 21. In this way, the user is protected from any damage caused via exposure to ultraviolet light.

In the illustrated embodiment, the visor 21 further comprises a pair of panels 22 telescopically affixed to opposing ends 24 of the visor 21, wherein the pair of panels 22 are configured to selectively move between an extended position and a retracted position. In alternate embodiments, a single panel 22 extending from one end 24 is contemplated. In one embodiment, an outer edge 23 of the panel 22 is configured to align with the end 24 of the visor 21 when in the retracted position, such that an entirety of the panel 22 is disposed within the visor 21. In an alternate embodiment, the outer edge 23 of the panel 22 comprises a lip thereon, wherein the lip is configured to prevent the panel 22 from fully receding into the visor 21. In this way, the panel 22 is easily grasped via the lip, such that the panel 22 can be moved towards the extended position thereby. In some embodiments, the panel 22 comprises the same ultraviolet light impermeable material as the exterior surface 34 of the visor 21. In an alternate embodiment, the panel 22 comprises a polarized translucent material configured to filter ultraviolet light, thereby providing the user with increased visibility therethrough.

Figure 5:
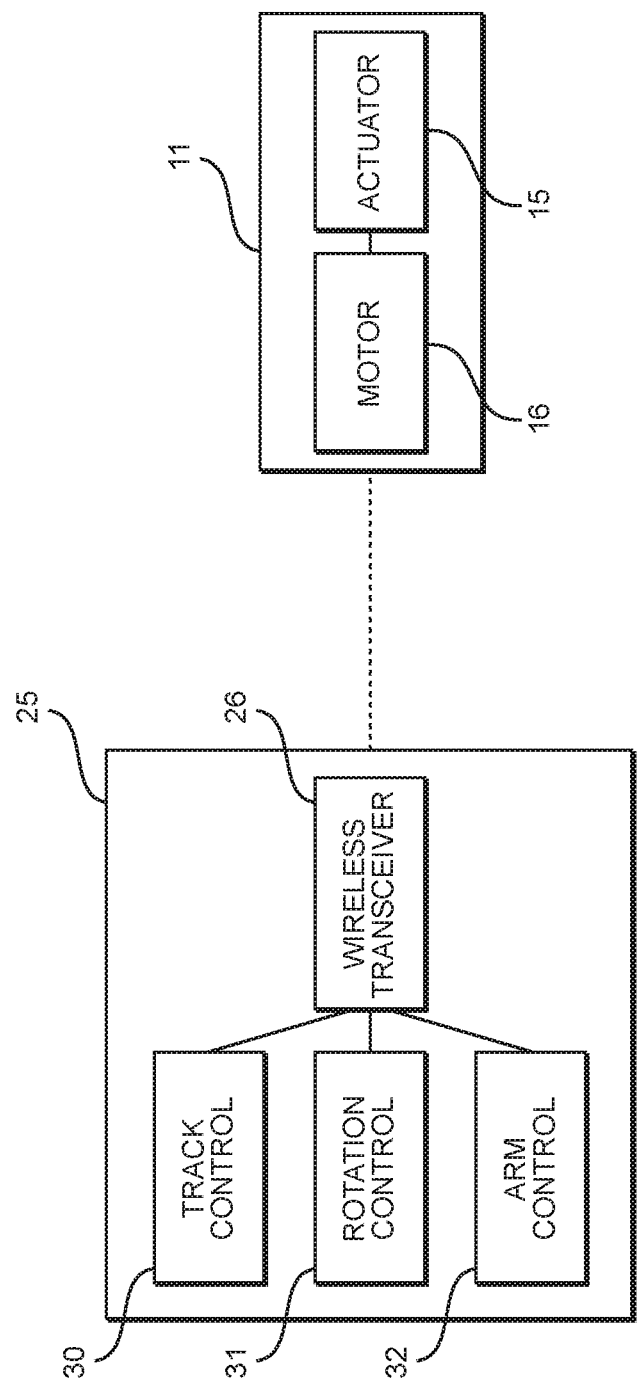
FIG. 5 shows a schematic view of an embodiment of the adjustable vehicle visor.

Referring now to FIG. 5, there is shown a schematic view of an embodiment of the adjustable vehicle visor. In the illustrated embodiment, a remote device 25 is in wireless communication with the adjustable visor system 11 via a wireless transceiver 26. The remote device 25 comprises a plurality of controls thereon, including a track control 30, a rotation control 31, and an arm control 32. Each of the controls is configured to send a command signal to the adjustable visor system 11 to independently actuate the motor 16 to drive the actuator 15 in a desired direction such that the visor is positioned appropriately. The track control 30 is configured to actuate the motor 16 to drive the actuator 15 along the length of the track when the track control 30 is actuated. The rotation control 31 is configured to actuate the motor 16 to drive the arm about the longitudinal axis of the actuator 15 when the rotation control 31 is actuated. Finally the arm control 32 is configured to actuate the motor 16 to drive the actuator to slide the arm along the longitudinal aperture when the arm control 32 is actuated. In this way the user can independently control each axis of movement for the arm, allowing a user to discretely and finely control the position of the visor as desired. In some embodiments, the remote device 25 can be paired with a plurality of adjustable visor systems 11, such that the user can control multiple adjustable visor systems 11 installed within a vehicle.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable vehicle visor, comprising:
a track removably securable to a ceiling of a vehicle;
an actuator slidably disposed within the track;
a motor operably connected to the actuator;

wherein the actuator is configured to move along the track when the motor is actuated;
an arm having a longitudinal aperture extending between a proximal end thereof and a distal end thereof;
wherein the arm is operably affixed to the actuator along the longitudinal aperture;
wherein the arm is configured to rotate about the actuator when the motor is actuated;
a visor pivotally affixed to the distal end of the arm;
a panel telescopically disposed within the visor the panel configured to selectively move between an extended position and a retracted position;
wherein the retracted position, an outer edge of the panel is aligned with an end of the visor;
a remote device in wireless communication with the motor;
wherein the remote device is configured to transmit a control signal to actuate the motor.

2. The adjustable vehicle visor of claim 1, wherein the arm is slidably about the actuator along the longitudinal aperture.

3. The adjustable vehicle visor of claim 2, wherein the arm is configured to move along the longitudinal aperture when the motor is actuated.

4. The adjustable vehicle visor of claim 1, wherein the actuator comprises an upper section slidably disposed within the track, a central section slidably disposed within the longitudinal aperture, and a lower section.

5. The adjustable vehicle visor of claim 4, wherein the upper section and the lower section comprise a greater diameter than the central section.

6. The adjustable vehicle visor of claim 1, wherein the remote device further comprises a track control configured to move the actuator along the track when the track control is actuated.

7. The adjustable vehicle visor of claim 1, wherein the remote device further comprises a rotation control configured to rotate the arm about the actuator when the rotation control is actuated.

8. The adjustable vehicle visor of claim 3, wherein the remote device further comprises an arm control configured to move the arm along the longitudinal aperture relative to the actuator when the arm control is actuated.

9. The adjustable vehicle visor of claim 1, wherein a panel is telescopically disposed within each end of the visor, such that each panel is configured to selectively move between an extended position and a retracted position wherein the retracted position, the outer edge of each panel is aligned with each end of the visor.

10. The adjustable vehicle visor of claim 1, wherein the distal end of the arm comprises a flange extending orthogonally therefrom, wherein the flange is configured to removably secure to the visor.

11. The adjustable vehicle visor of claim 10, wherein the flange is pivotally affixed to the distal end.

12. The adjustable vehicle visor of claim 10, wherein a width of the flange increases from the distal end of the arm towards the far end of the flange.

13. The adjustable vehicle visor of claim 1, wherein an exterior surface of the visor comprises a material configured to filter ultraviolet light.

14. The adjustable vehicle visor of claim 1, wherein the panel comprises a translucent polarized material configured to filter ultraviolet light.

15. The adjustable vehicle visor of claim 1, wherein a linear distance between the proximal end of the arm and the longitudinal aperture is less than a linear distance between the distal end of the arm and the longitudinal aperture.

\* \* \* \* \*